June 17, 1924.
N. C. HILL
RECOVERING SULPHUR TRIOXIDE
Filed Aug. 3, 1921
1,498,168
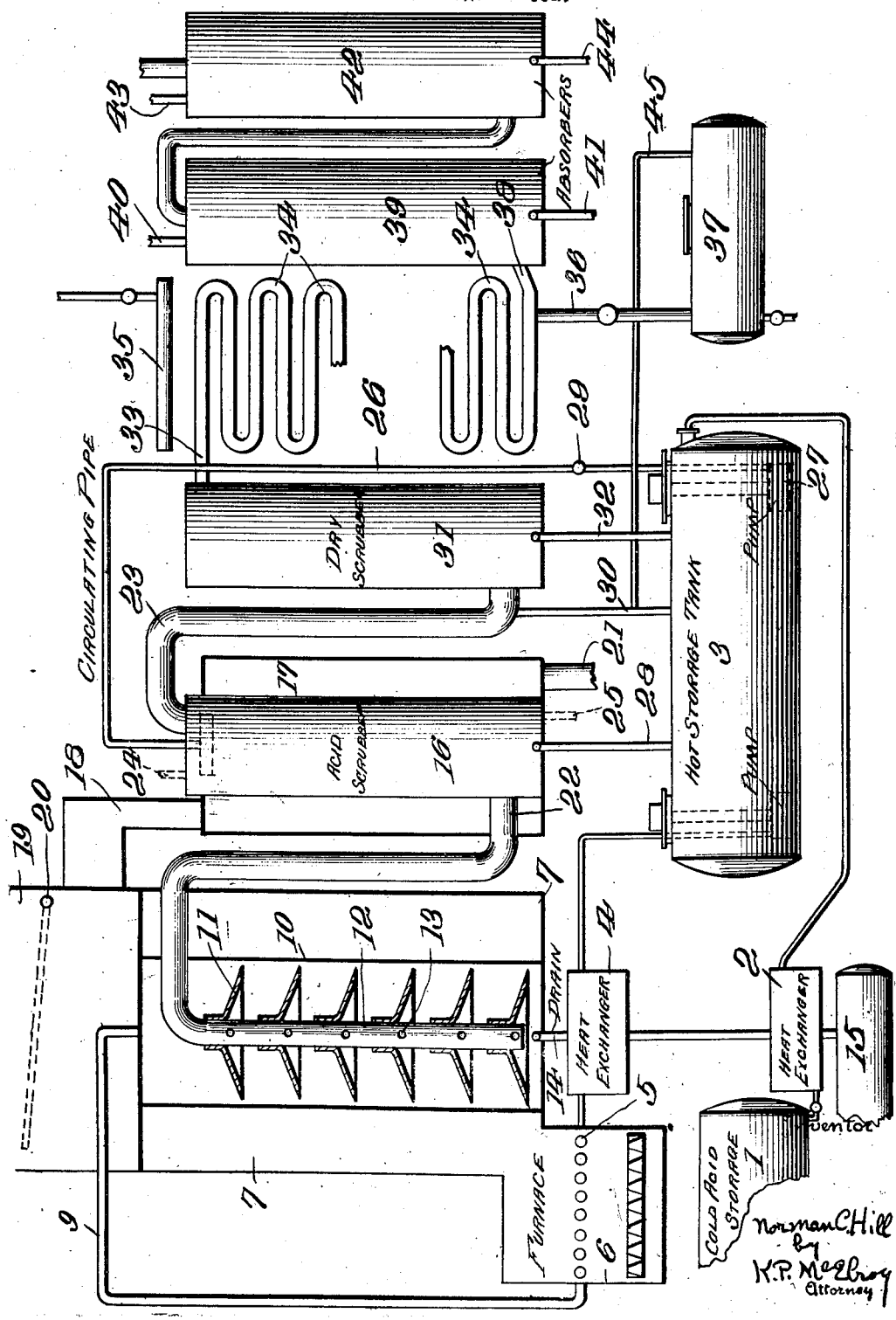

Patented June 17, 1924.

1,498,168

UNITED STATES PATENT OFFICE.

NORMAN C. HILL, OF ST. LOUIS, MISSOURI.

RECOVERING SULPHUR TRIOXIDE.

Application filed August 3, 1921. Serial No. 489,493.

*To all whom it may concern:*

Be it known that I, NORMAN C. HILL, a citizen of the United States, residing at St. Louis, in the county of St. Louis and State of Missouri, have invented certain new and useful Improvements in Recovering Sulphur Trioxide, of which the following is a specification.

This invention relates to recovering sulphur trioxide; and it comprises a method of regaining sulphur trioxide wherein sulfuric acid containing the same is passed in continuous flow through a tubular heating chamber into a releasing chamber provided with means for filming out the heated acid; and the released vapors are cooled to a point short of their condensing temperature by a regulated flow of acid to be distilled and are then condensed or absorbed; and it further comprises as a new organization of apparatus elements a tubular heater of acid-resistant material, a towerlike releasing chamber provided with internal filming means and receiving hot acid from the tubular heater, means for delivering acid to the tubular means, means for removing trioxide vapors from the releasing means, means for cooling said vapors by acid en route to the heating means, and means for recovering the trioxide of the cooled vapors; all as more fully hereinafter set forth and as claimed.

Sulphur trioxide, $SO_3$, sometimes known as sulfuric anhydrid, is readily produced by the oxidation of $SO_2$ by atmospheric oxygen with the aid of a catalyst, (usually platinum) in the "contact process" but as so made it is diluted with great volumes of nitrogen and other gases and is hard to condense and recover as such. In practice no attempt is made at direct condensation of the trioxide and the gases are scrubbed with concentrated sulfuric acid in which the trioxide dissolves, producing fuming acid or oleum; an acid containing a greater ratio of $SO_3$ to $H_2O$ than corresponds to the 1:1 ratio of sulfuric acid, $H_2SO_4$. Ordinarily acids stronger in $SO_3$ than would correspond to an acid of about 112.5 per cent equivalent $H_2SO_4$ cannot be readily produced in regular operation by direct absorption in the contact process. Acids of a higher content of $SO_3$ are however desirable for various purposes. $SO_3$ itself is also desirable commercially. It is a purpose of the present invention to provide a simple and economical way of separating and recovering the trioxide from fuming acid, to be marketed as such or used in strengthening other fuming acid to a higher $SO_3$ content. Or it may be used in the production of the so-called fortifying acids employed in the manufacture of explosives, or dyes.

Sulphur trioxide is a relatively volatile body and can be removed from sulfuric acid containing it by distillation thereof; but the operation, because of the nature of the acid and of the trioxide, is a difficult one. Heating, distillation and condensation are all difficult. The consumption of heat is also large.

In the present invention I obviate the difficulties inherent in attempts to handle materials of this kind by ordinary distilling means and provide a method of continuous distillation in which heating of the acid and distillation or vaporization of the trioxide from the hot acid are separately performed; the fuming acid being continuously passed through a tubular heating element as a flowing current and then into a special releasing or stripping element where it is filmed out and freed of its volatiles. In so doing, the amount of acid to be heated is not great at any one time and there is a constant and uniform delivery of trioxide vapors. This uniformity of delivery is conducive to efficient work of the condensing means. Operating in this manner, an opportunity is afforded for a methodical utilization of heat by the use of heat exchanging means and this is done. After stripping the acid of its trioxide, the heat of the stripped acid is transferred to fresh acid to be distilled, the stripped acid being thereby cooled and adapted to serve anew as an absorbing means in a contact plant. Some of it may be used as absorbing means in the final absorbing means of a condensing and absorbing train hereinafter described. The trioxide vapors are usually very hot and carry considerable amounts of sulfuric acid as entrained mist or vapor and should be somewhat cooled and be freed of this acid to permit condensation of trioxide as such. The excess heat may be, and advantageously is, transferred to the acid to be distilled. The cooled and purified trioxide vapors are condensed, or are absorbed in sulfuric acid as the case may be. The vapors carry no substantial amount of air or diluting gas, and condensation or absorption of the $SO_3$ can be readily accomplished. Sulphur trioxide vapors, free of sulfuric acid, on cooling somewhat, give a liquid condensate of trioxide. Further cooling, or the presence of traces of $H_2SO_4$, leads to polymerization and to the formation of a crystallized solid product. Formation of this solid product is not here desirable since it may lead to a stoppage. At the temperature of formation of liquid $SO_3$, the $SO_3$ has still a considerable vapor tension; that is, some $SO_3$ is condensed as a liquid and some $SO_3$ vapor tends to pass beyond a condenser held at the temperature where formation of liquid $SO_3$ occurs. It is therefore commonly desirable to provide beyond the condensing means suitable absorption means for recovering this vapor. These absorption means may be supplied with acid from the system hereinafter described, or with contact acid to be strengthened. Usually it is desirable to have at least two absorbers, the last one in series being fed with ordinary 98 to 99.8 per cent sulfuric acid; this concentration of acid being best suited for absorption.

In the accompanying illustration I have shown, more or less diagrammatically certain organizations of apparatus elements within the present invention and susceptible of use in the performance of the stated process. In this showing the figure is a view in central vertical section, certain parts being shown in elevation. For the sake of simplicity of illustration, showing of heat insulating means, which should be used wherever practicable, has been omitted. All pipes, tanks, towers, etc., where heat losses are injurious should be well lagged; and flues and furnace walls should contain intermediate layers of a good grade of heat insulating brick.

Element 1 is a storage tank for cold fuming acid. This acid may come directly from the absorbing system of a contact acid plant (not shown). Acid from this tank is heated somewhat in low temperature heat exchanger 2 and is delivered to hot storage tank 3, where it is further raised in temperature by recovered heat, using various expedients hereinafter described. Acid from tank 3 passes through high temperature heat exchanger 4 and goes thence to tubular heater 5 located in furnace 6, fired in any usual way. Hot products of combustion from the furnace go to and through tower-like flue 7. In passing through the tubular heater the fuming acid is heated to a high temperature without much actual separation of vapors of sulphur trioxide. The hot acid and such vapor as may separate go together through conduit 9 into the top of releasing or stripping tower 10 mounted in and heated by the tower-like flue (7) previously referred to. Within this tower are film-forming devices, such as the coned plates 11 shown. As shown they are mounted on and supported by a central tubular vapor conduit 12. Inlet orifices 13 are provided in this tube below each of the coned plates. In flowing down over the plates, the hot acid is stripped of its $SO_3$ which vaporizes. The hot stripped acid leaves the bottom of the tower through 14, and passes first through the high temperature exchanger (4) previously mentioned and then through the low temperature exchanger (2), finally going to storage tank 15 as cooled acid which may be sent back to the absorbing system of a contact acid plant or to the final absorber of the present system. The vapors of trioxide leaving the stripping tower carry more or less sulfuric acid as vapor and entrained mist. It is desirable to free them of this acid and to adjust and somewhat lower their temperature. I therefore pass them through acid scrubber 16 in contact with a flow of cooler acid. In order to prevent too much cooling in this tower, it is desirable to heat it somewhat. In the drawing I have shown the tower as surrounded by heating casing 17 drawing products of combustion through flue 18 from the chamber surrounding the stripping tower. Waste gas outlet 19 from this chamber is provided with damper 20 to permit by-passing the desired amount of hot gases into and through this heating casing to outlet 21 at the base connected with any suitable flue (not shown). The scrubber which is diagrammatically shown, may be provided with any of the usual packings used in scrubbing towers for giving large area contact between vapors and liquids. Rings, blocks, etc., of acid resistant material may be employed. Trioxide vapors enter the scrubber through inlet 22 and leave through conduit 23 leading to the dry scrubber. A temperature adjustment of the kind here desired is very easily effected by a flow of fuming acid circulating in closed circuit from and to the hot storage tank previously referred to and at the same time the excess heat is transferred to this acid and thereby utilized. Absorption of trioxide vapors by the circulating acid develops heat while vaporization of trioxide therefrom absorbs heat; and the two effects balance out more or less giving a good temperature adjustment. Other ways of cleaning and cooling by flowing acid may be adopted. The scrubber may, for instance be supplied with cooled fuming acid, from the contact plant, which it is desired to strengthen. For this purpose, the scrubber may be provided with inlet 24 (shown in dotted lines) for acid and outlet 25 for strengthened acid. In this case tower 16 is usually not heated and may be cooled. However, in what I regard as the best embodiment of my invention, hot acid to be treated serves both as an absorbing or scrubbing means and as a temperature-adjusting means and a circulation of acid to and from the hot storage tank is used. Acid is taken from this hot storage tank by conduit 26 and pump 27 and delivered to the top of the scrubber. As shown, the circulating pump 27 is mounted directly in the hot storage tank. The acid emerges at the base of the tower through conduit 28 leading back to the hot storage tank. Operating in this manner, the excess heat of the trioxide vapors is efficiently returned to the acid which is to undergo distillation; and it is a mere matter of regulating the speed of the pump or adjusting valve 29 to produce such a degree of cooling of the trioxide vapors as may be desired. The acid from storage tank 3 while hot is, of course, at a lower temperature than the trioxide vapors entering scrubber 16 through pipe 22. In the scrubber, it is desirable to cool the trioxide vapors down to a point near but somewhat above their condensing temperature. Whether there be absorption of trioxide by the circulating acid or liberation of trioxide vapor therefrom, is immaterial since the trioxide does not leave the system. Any pressure due to vapors of trioxide evolved in the hot storage tank is taken care of by relief pipe 30, leading back to the vapor system. The cooled and cleaned trioxide vapors from the acid scrubber leave through conduit 23 and enter a dry scrubber 31 filled with any suitable acid resistant packing, such as bricks, rings, coke, etc. In passing up through the packing material the vapors are freed of entrained acid, the separated acid flowing through conduit 32 back to the hot storage tank. The purified trioxide vapors go through conduit 33 to cooling coils 34 forming a trioxide condenser. As shown, these coils are air cooled, the air cooling being supplemented by a water spray from suitable means 35. In the coils the vapors are, or may be, cooled sufficiently to produce a separation of $SO_3$ in the liquid form, this liquid passing through T connection 36 to a tank 37. Residual vapors go through conduit 38 to absorbing towers. Two are shown and at least two should be used. In the first, 39, acid from the present system or fuming acid to be strengthened may be employed, being introduced through inlet 40 and discharged through outlet 41. In the last absorber 42 in series, ordinary 98 to 99.8 per cent sulfuric acid may be introduced through inlet 43 and discharged through outlet 44. Stripped acid from storage tank 15 is here useful, after being weakened to a strength of 98 to 99.8 per cent $H_2SO_4$. If at any time absorption of $SO_3$, rather than direct condensation is desired, the coils 34 are simply not cooled; and the apparatus shown can be used to strengthen acid. As described, however, the apparatus functions for the production and isolation of trioxide as such. This trioxide may be used for any purposes for which it is suitable including the strengthening of fuming acid to obtain any concentration of $SO_3$ which may be desired up to 100 per cent $SO_3$, being limited of course by the concentration of acid to be strengthened.

What I claim is:—

1. In the manufacture of sulphur trioxide, the process which comprises continuously passing a flow of fuming sulfuric acid through a tubular heating element, filming out the hot acid in a releasing chamber, removing the stripped acid, collecting the vapors of sulphur trioxide, scrubbing the vapors to remove entrained sulfuric acid and condensing the vapors to trioxide.

2. In the manufacture of sulphur trioxide, the process which comprises distilling fuming sulfuric acid to produce hot vapors of trioxide and contacting such vapors with a flow of acid to be distilled.

3. In the manufacture of sulphur trioxide, the process which comprises heating fuming sulfuric acid by exchanged heat, further heating said acid by furnace heat, filming out the hot acid to permit extrication of trioxide vapors, the stripped acid being returned to furnish such exchanged heat, and scrubbing the vapors to remove entrained sulfuric acid.

4. In the manufacture of sulphur trioxide, the process which comprises establishing and maintaining a body of hot fuming sulfuric acid, passing said acid in continuous current through suitable heating elements to heat it to a high temperature, filming it out to permit extrication of trioxide vapors, removing the stripped acid and transferring its heat to acid en route to the high temperature heating means, removing the trioxide vapors and contacting the same with a cyclic flow of acid from and to said body, removing entrained acid and recovering trioxide from the cooled and purified vapors.

5. In the manufacture of sulphur trioxide, the process which comprises establishing and maintaining a body of hot fuming sulfuric acid, passing said acid in continuous current through suitable heating elements to heat it to a high temperature, filming it out to permit extrication of trioxide vapors, removing the stripped acid and transferring its heat to acid en route to the high temperature heating means, removing the trioxide vapors and contacting the same with a cyclic flow of acid from and to said body, removing entrained acid and recovering trioxide from the cooled and purified vapors by cooling sufficiently to permit condensation in the liquid form.

6. In the manufacture of sulphur trioxide, the process which comprises establishing and maintaining a body of hot fuming sulfuric acid, passing said acid in continuous current through suitable heating elements to heat it to a high temperature, filming it out to permit extrication of trioxide vapors, removing the stripped acid and transferring its heat to acid en route to the high temperature heating means, removing the trioxide vapors and contacting the same with a cyclic flow of acid from and to said body, removing entrained acid and recovering trioxide from the cooled and purified vapors by cooling and absorption.

7. In the production of sulphur trioxide the process which comprises distilling fuming sulfuric acid, cooling the vapors to remove sulfuric acid, cooling the vapors of entrained acid and further cooling sufficiently to produce a condensation of liquid $SO_3$.

8. In the production of sulphur trioxide the process which comprises distilling fuming sulfuric acid, cooling the vapors to remove sulfuric acid, freeing the vapors of entrained acid, further cooling sufficiently to produce a condensation of liquid $SO_3$ and passing residual $SO_3$ vapors into contact with sulfuric acid to recover such residual $SO_3$.

9. A plant for producing sulphur trioxide from fuming sulfuric acid comprising tubular heating means, means for supplying acid thereto, a releasing tower containing film-forming devices, means for delivering heated acid thereto, means for removing trioxide vapors, means for removing stripped acid therefrom, means for cooling said trioxide vapors and removing entrained acid therefrom and means for condensing the cooled vapors.

10. A plant for producing sulphur trioxide from fuming sulfuric acid comprising tubular heating means, means for supplying acid thereto, a releasing tower containing film-forming devices, means for delivering heated acid thereto, means for romoving trioxide vapors, means for removing stripped acid therefrom, said means including means for transferring heat from the stripped acid to the acid supplied, means for cooling said trioxide vapors and removing acid therefrom and means for condensing the cooled vapors.

11. A plant for producing sulphur trioxide from fuming sulfuric acid comprising tubular heating means, means for supplying acid thereto, a releasing tower containing film-forming devices, means for delivering heated acid thereto, means for removing trioxide vapors, means for removing stripped acid therefrom, means for cooling said trioxide vapors and removing acid therefrom, said means including means for flowing acid to be distilled in contact with said vapors.

In testimony whereof, I have hereunto affixed my signature.

NORMAN C. HILL.